United States Patent
Ying et al.

(10) Patent No.: US 10,542,514 B2
(45) Date of Patent: Jan. 21, 2020

(54) POSITIONING DATA BASED CELL MANAGEMENT

(71) Applicant: Sony Corporation, Tokyo (JP)

(72) Inventors: Zhinong Ying, Lund (SE); Vanja Plicanic Samuelsson, Lund (SE); Erik Bengtsson, Eslöv (SE); Rickard Ljung, Helsingborg (SE)

(73) Assignee: SONY CORPORATION, Tokyo (JP)

( * ) Notice: Subject to any disclaimer, the term of this patent is extended or adjusted under 35 U.S.C. 154(b) by 335 days.

(21) Appl. No.: 14/554,777

(22) Filed: Nov. 26, 2014

(65) Prior Publication Data

US 2015/0148067 A1    May 28, 2015

(30) Foreign Application Priority Data

Nov. 27, 2013 (EP) .................................. 13194617

(51) Int. Cl.
*H04W 48/20* (2009.01)
*H04W 64/00* (2009.01)
(Continued)

(52) U.S. Cl.
CPC .......... *H04W 64/00* (2013.01); *H04B 7/0421* (2013.01); *H04B 7/061* (2013.01);
(Continued)

(58) Field of Classification Search
CPC ... H04W 52/0206; H04W 36/00; H04W 8/04; H04W 40/36; H04W 4/029; H04W 4/02;
(Continued)

(56) References Cited

U.S. PATENT DOCUMENTS

| 6,415,132 B1* | 7/2002 | Sabat, Jr. ......... H04B 10/25755 |
| | | 455/3.01 |
| 8,718,619 B2* | 5/2014 | Lidstrom ................ H04W 4/02 |
| | | 455/414.2 |

(Continued)

FOREIGN PATENT DOCUMENTS

| EP | 2416609 A1 | 2/2012 |
| JP | 2013098931 A | 5/2013 |
| WO | 2009095576 A2 | 8/2009 |
| WO | 2010151186 A1 | 12/2010 |

OTHER PUBLICATIONS

European Office Action from corresponding European Application No. 13194617, pp. 1-6, dated Nov. 14, 2017.

*Primary Examiner* — Fred A Casca
(74) *Attorney, Agent, or Firm* — Tucker Ellis LLP; Evan T. Perry

(57) ABSTRACT

A mobile communication network comprises a first cell (200) and a second cell (210, 220, 230, 240) arranged in a coverage area of the first cell (200). A node (100) of the mobile communication network obtains positioning data of a UE (11, 12, 13, 14, 15, 16). The node (100) correlates the positioning data to a coverage area of the second cell (210, 220, 230, 240). Depending on the correlation of the positioning data and the coverage area of the second cell (210, 220, 230, 240), the node (100) selects between an active state and an inactive state of the second cell (210, 220, 230, 240). In accordance with the selected state, the node controls a base station of the second cell (210, 220, 230, 240).

16 Claims, 6 Drawing Sheets

Figure 1:
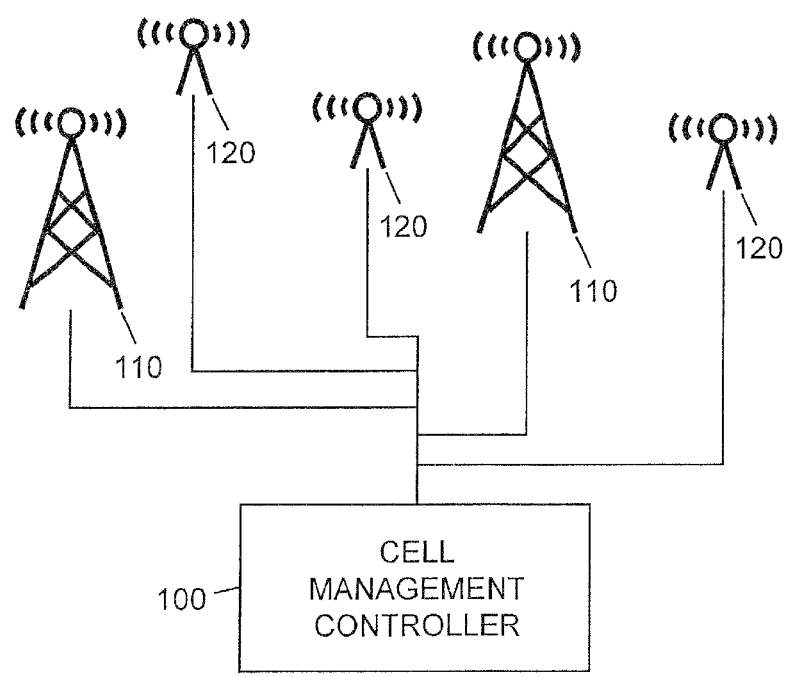

(51) Int. Cl.
*H04W 52/02* (2009.01)
*H04B 7/0417* (2017.01)
*H04W 84/04* (2009.01)
*H04B 7/06* (2006.01)
*H04W 24/02* (2009.01)
*H04B 7/0413* (2017.01)

(52) U.S. Cl.
CPC .......... *H04B 7/0695* (2013.01); *H04W 48/20* (2013.01); *H04W 52/0206* (2013.01); *H04W 84/042* (2013.01); *H04B 7/0413* (2013.01); *H04W 24/02* (2013.01); *Y02D 70/1264* (2018.01)

(58) Field of Classification Search
CPC ... H04W 64/00; H04W 4/027; H04W 64/003; H04W 4/80; H04W 4/025; H04W 36/32; H04W 36/30; H04W 36/04; H04M 15/8038; H04M 2215/32; H04M 2215/34; H04M 2215/7442; Y02D 70/1262; Y02D 70/1264; G01S 19/42
USPC ..... 370/254, 311; 455/432.1, 433, 436, 443, 455/444, 456.1
See application file for complete search history.

(56) References Cited

U.S. PATENT DOCUMENTS

| | | | |
|---|---|---|---|
| 8,843,157 B2* | 9/2014 | Miyake | H04W 4/028 455/404.2 |
| 2010/0056184 A1 | 3/2010 | Vakil et al. | |
| 2012/0258733 A1* | 10/2012 | Fischer | H04W 4/20 455/456.1 |
| 2013/0083714 A1* | 4/2013 | Joko | H04W 52/0206 370/311 |
| 2013/0095836 A1* | 4/2013 | Carmon | H04W 52/0206 455/438 |
| 2013/0252660 A1 | 9/2013 | Bach | |
| 2013/0326137 A1* | 12/2013 | Bilange | G06F 12/0866 711/113 |
| 2013/0344842 A1* | 12/2013 | McDonald | H04W 64/006 455/404.2 |
| 2014/0207709 A1* | 7/2014 | Gottschlich | H04W 64/006 706/11 |
| 2015/0045048 A1* | 2/2015 | Xu | H04W 4/023 455/452.1 |
| 2015/0072706 A1* | 3/2015 | Michaelsen | H04W 64/006 455/456.1 |

* cited by examiner

POSITIONING DATA BASED CELL MANAGEMENT

This application claims priority to European Patent Application No. 13194617.0 filed on Nov. 27, 2013, the disclosure of which is hereby incorporated by reference herein.

The present invention relates to methods for managing cells of a mobile communication network and to corresponding devices.

In mobile communication networks using a cellular radio access technology, it is known to use a so-called heterogeneous network deployment. In such heterogeneous network deployment, a cell providing basic coverage of the mobile communication network may be supplemented by one or more additional cells which are located in the coverage area of the first-mentioned cell. Such cell providing basic coverage is also referred to as macro cell, whereas the additional cells are referred to as pico cells. A pico cell is typically served by a base station which operates with lower power than a base station of the macro cell. Accordingly, the pico cells typically have a coverage area which is small as compared to the coverage area of the macro cell.

The usage of pico cells allows for offloading traffic from the macro cell to the pico cell, thereby improving capacity of the mobile communication network in the coverage area of the macro cell. Further, the usage of pico cells may offer improved performance when serving a user equipment (UE) in a pico cell. Specifically, due to the smaller coverage area of the pico cell, the UE will in many cases be in close proximity to the base station of the pico cell, which in turn may provide a high radio channel quality. Further, the UE may need to share the radio resources of the pico cell only with a relatively small number of other UEs. The pico cell may also be used to improve performance of the UE by using the macro cell and pico cell simultaneously, e.g., by carrier aggregation.

However, the deployment of pico cells also causes additional power consumption by the base stations of the pico cells. Further, the operation of the pico cells typically generates interference, which may for example adversely affect other cells of the mobile communication network. Finding a deployment with an appropriate number of pico cells, which balances on the one hand capacity and performance requirements and on the other hand the power consumption and interference requirements, is further complicated by the fact that the load of the mobile communication network, e.g., in terms of the number of UEs which need to be served in a given area or the amount of data transferred by the UEs in a given area, may vary considerably over time.

Accordingly, there is a need for techniques which allow for efficiently utilizing the cells of a mobile communication network.

According to an embodiment of the invention, a method for management of cells of a mobile communication network is provided. The mobile communication network comprises a first cell and a second cell arranged in a coverage area of the first cell. Additional cells may be provided as well. Further, a plurality of second cells could be arranged in the coverage area of the first cell. According to the method, a node of the mobile communication network obtains positioning data of a UE. The node then correlates the positioning data with a coverage area of the second cell. Depending on the correlation of the positioning data and the coverage area of the second cell, the node selects between an active state and an inactive state of the second cell. In accordance with the selected state, the node controls a base station of the second cell. In the inactive state of the second cell, at least a radio transmitter of the base station of the second cell may be switched off. Also other components of the base station may be switched off in the inactive state, e.g., a radio receiver. Further, it is to be understood that the selection between the active state and the inactive state of the second cell may further depend on additional criteria. For example, the selection between the active state and the inactive state of the second cell may depend on a load of the first cell and/or on a performance requirement of the UE.

According to an embodiment, the positioning data comprise information on a location of the UE. In this case the node may use the positioning data to determine whether the location of the UE is within the coverage area of the second cell. In response to the location of the UE being within the coverage area of the second cell, the node may select the active state of the second cell. Similarly, in response to the location of the UE being outside the coverage area of the second cell, the node may select the inactive state of the second cell.

According to an embodiment, the positioning data comprise information on movement of the UE, e.g., a velocity of the UE and/or a direction of movement of the UE. In this case, the node may determine whether the movement of the UE is toward the coverage area of the second cell. In response to the movement of the being toward the coverage area of the second cell, the node may select the active state of the second cell. For example, the node may estimate a future position of the UE from the information on the movement of the UE. In response to the future location of the UE being within the coverage area of the second cell, the node may select the active state of the second cell. In response to the velocity of the UE being above a threshold, the node may rather select the inactive state of the second cell.

According to a further embodiment of the invention, a node for management of cells of a mobile communication network is provided. The mobile communication network comprises a first cell and a second cell arranged in a coverage area of the first cell. Additional cells may be provided as well. Further, a plurality of second cells could be arranged in the coverage area of the first cell. The node comprises an interface for controlling a base station of the second cell. Further, the node comprises at least one processor. The at least one processor is configured to obtain positioning data of a UE. Further, the at least one processor is configured to correlate the positioning data with a coverage area of the second cell. Further, the at least one processor is configured to select, depending on the correlation of the positioning data and the coverage area of the at least one second cell, between an active state and an inactive state of the second cell. Further, the at least one processor is configured to control the base station of the second cell in accordance with the selected state. In the inactive state of the second cell, at least a radio transmitter of the base station of the second cell may be switched off. Also other components of the base station may be switched off in the inactive state, e.g., a radio receiver. Further, it is to be understood that the selection between the active state and the inactive state of the second cell may further depend on additional criteria. For example, the selection between the active state and the inactive state of the second cell may depend on a load of the first cell and/or on a performance requirement of the UE.

The at least one processor may be configured to perform the steps of the above method.

In particular, the positioning data may comprise information on a location of the UE. In this case the at least one processor may use the positioning data to determine whether the location of the UE is within the coverage area of the second cell. In particular, the at least one processor may be configured to select the active state of the second cell in response to the location of the UE being within the coverage area of the second cell. Similarly, the at least one processor may be configured to select the inactive state of the second cell in response to the location of the UE being outside the coverage area of the second cell.

Further, the positioning data may comprise information on movement of the UE, e.g., a velocity of the UE and/or a direction of movement of the UE. In this case, the at least one processor use the positioning data to determine whether the movement of the UE is toward the coverage area of the second cell. In particular, the at least one processor may be configured to select the active state of the second cell in response to the movement of the being toward the coverage area of the second cell. For example, the at least one processor may be configured to estimate a future position of the UE from the information on the movement of the UE and, in response to the future location of the UE being within the coverage area of the second cell, select the active state of the second cell. Further, the at least one processor may be configured to select the inactive state of the second cell in response to the velocity of the UE being above a threshold.

In the above embodiments of the method and node, the positioning data of the UE may be based on satellite positioning measurements performed by the UE. Such measurements may be reported by the UE to the mobile communication network and then utilized for obtaining the positioning data. Alternatively or in addition, the positioning data of the UE may be based on multilateration measurements and/or multiangulation measurements performed by base stations of the mobile communication network. For example, trilateration or triangulation measurements could be used. The multilateration or multiangulation measurements may for example be performed by a base station of the first cell and one or more other base stations. Also the base station of the second cell may be involved in the multilateration or multiangulation measurements.

The above and further embodiments of the invention will now be described in more detail with reference to the accompanying drawings.

FIG. 1 schematically illustrates infrastructure of a heterogeneous deployment of a mobile communication network which comprises a cell management controller according to an embodiment of the invention.

Figure 2:
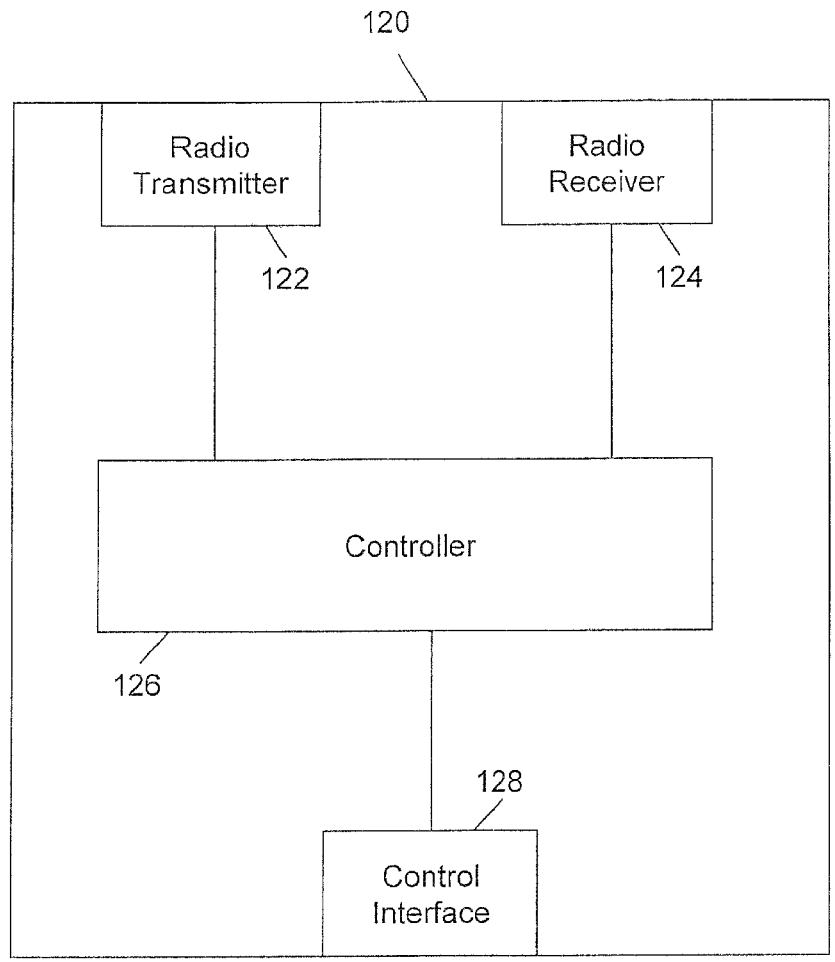

FIG. 2 schematically illustrates components of a pico base station which may be controlled in accordance with an embodiment of the invention.

Figure 3:
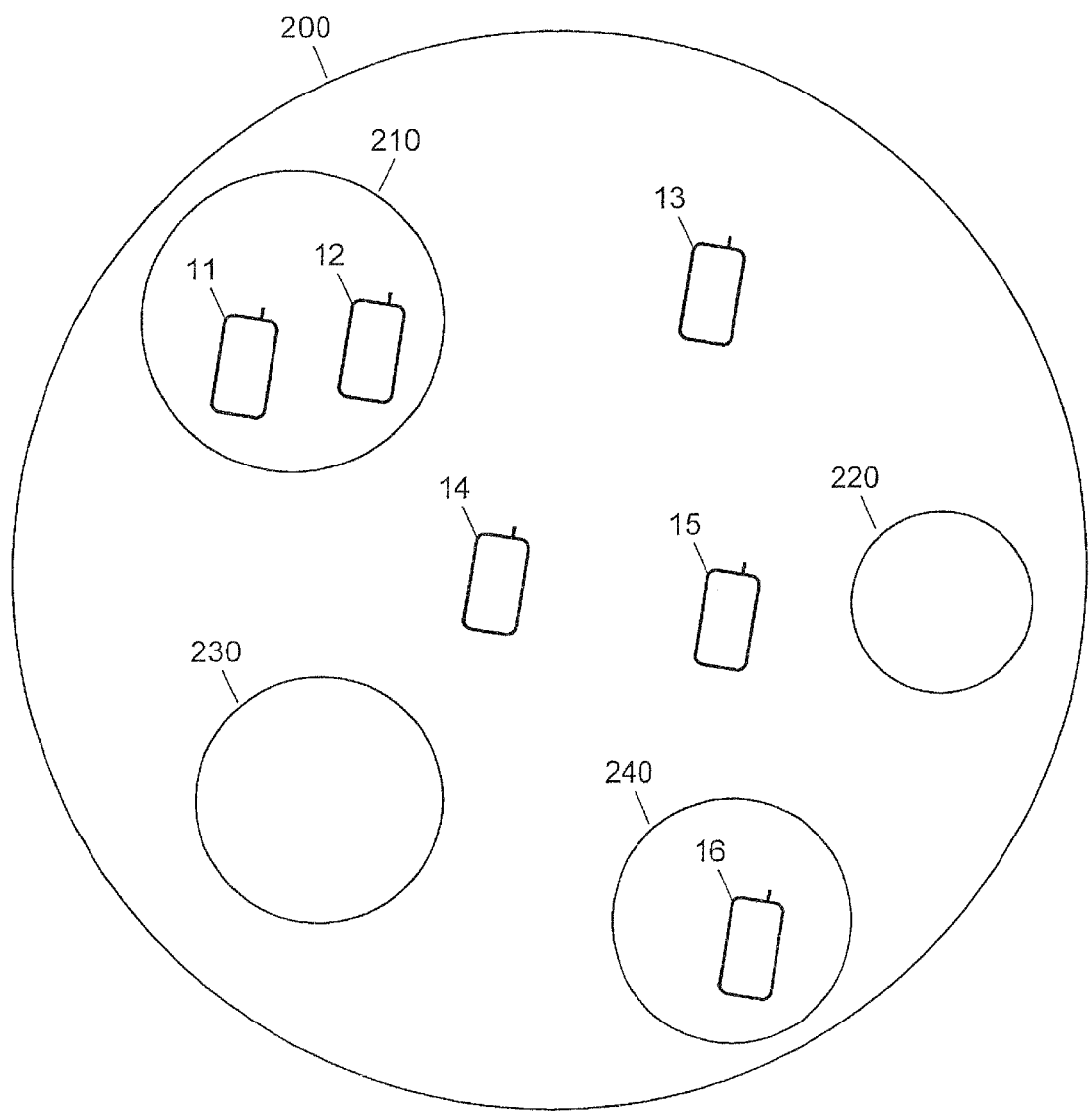

FIG. 3 schematically illustrates an exemplary scenario in which multiple UEs are located within the coverage area of a macro cell which is supplemented by pico cells.

Figure 4:
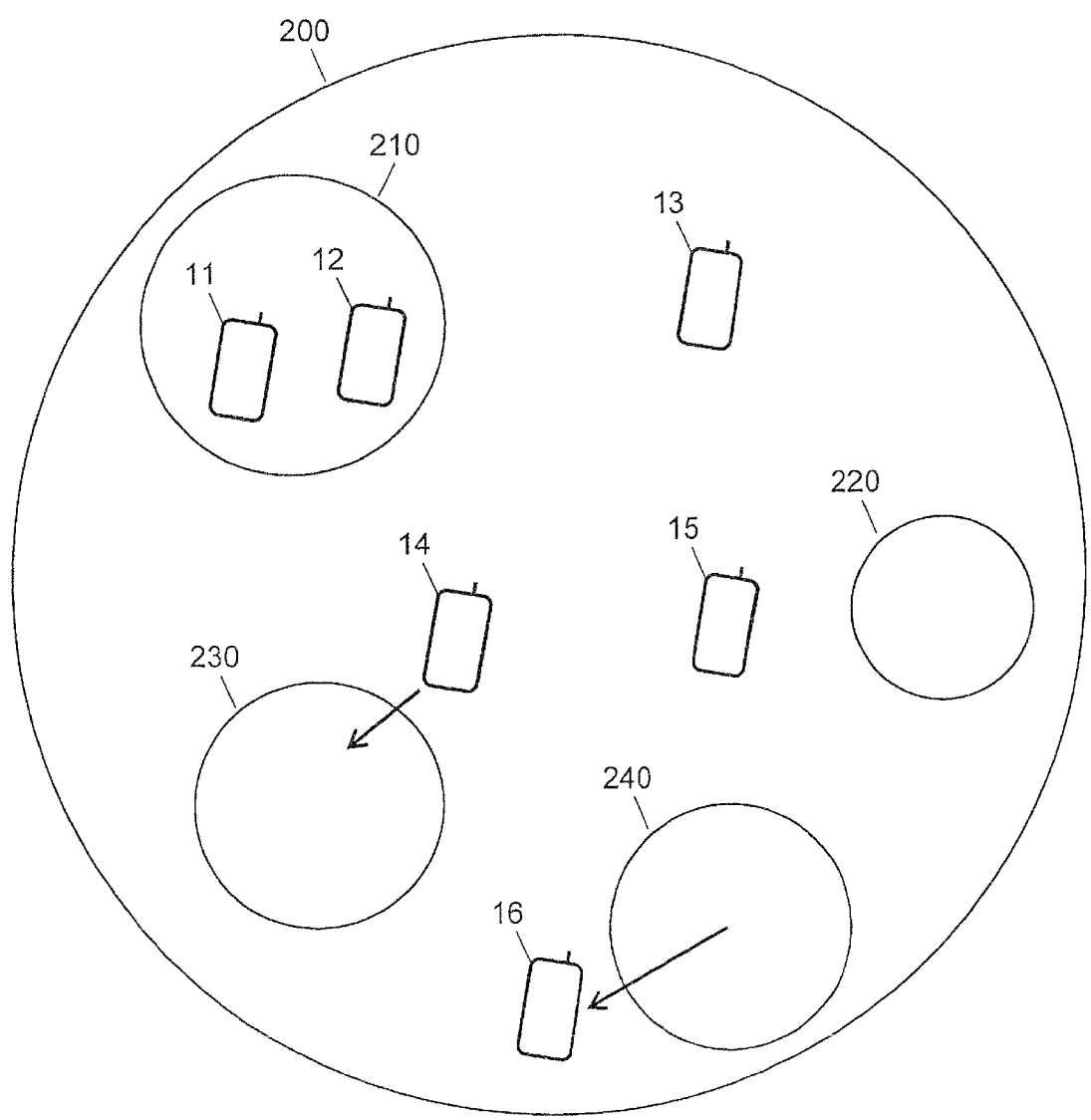

FIG. 4 schematically illustrates a further exemplary scenario in which the UEs are located at different positions as compared to the scenario of FIG. 3.

Figure 5:
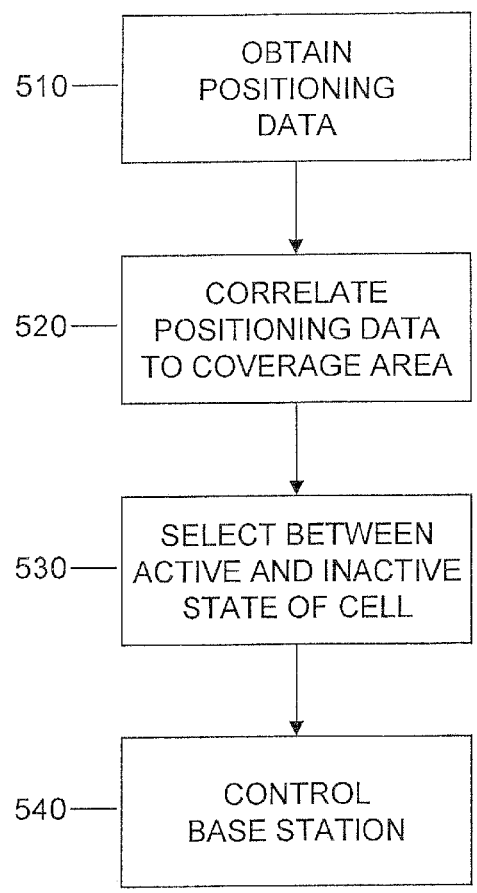

FIG. 5 shows a flowchart for illustrating a method according to an embodiment of the invention.

Figure 6:
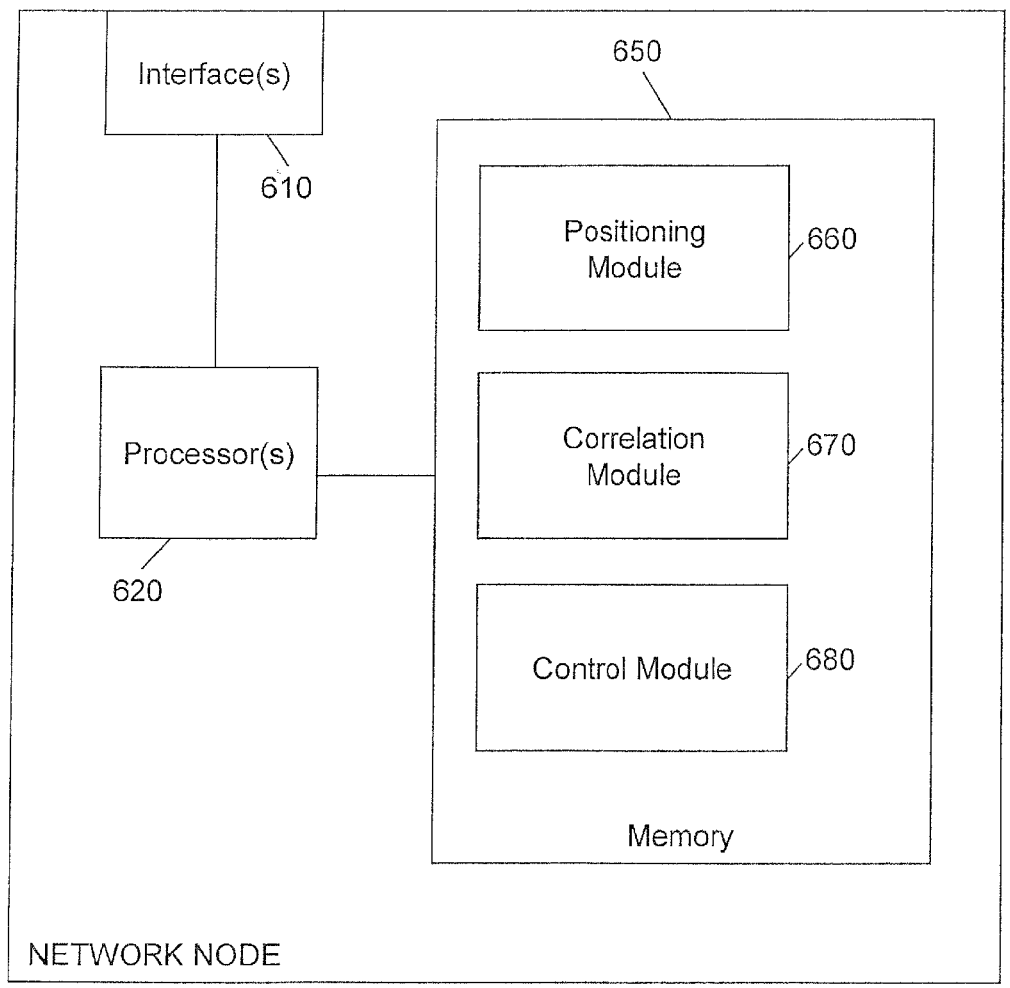

FIG. 6 schematically illustrates a node for implementing the cell activation controller.

In the following, exemplary embodiments of the invention will be described in more detail. It has to be understood that the following description is given only for the purpose of illustrating the principles of the invention and is not to be taken in a limiting sense. Rather, the scope of the invention is defined only by the appended claims and is not intended to be limited by the exemplary embodiments hereinafter.

The illustrated embodiments relate to methods and devices for management of cells of a mobile communication network. The mobile communication network is assumed to utilize one or more cellular radio access technologies such as Global System for Mobile Communications (GSM), Code Division Multiple Access (CDMA) based cellular radio access technologies such as Universal Mobile Telecommunications System (UMTS), Wideband-CDMA, or CDMA2000, or the LTE (Long Term Evolution) cellular radio access technology specified by the $3^{rd}$ Generation Partnership Project (3GPP). In addition, also other radio technologies may be supported, such as Wireless Local Area Network (WLAN) or WiMAX (Worldwide Interoperability for Microwave Access).

FIG. 1 schematically illustrates infrastructure of the mobile communication network. Specifically, FIG. 1 illustrates base stations 110, 120 of the mobile communication network which are used for a heterogeneous deployment with macro cells which are served by the base stations 110 and pico cells which are served by the base stations 120. Accordingly, the base stations 110 may also be referred to as macro base stations, and the base stations 120 may also be referred to as pico base stations. The pico base stations 120 typically operate with lower transmit power than the macro base stations 110.

In the heterogeneous deployment, one or more of the pico cells are located in the coverage area of one of the macro cells. Accordingly, a UE which is in the coverage area of one of these pico cells may either be served by this macro cell or by the pico cell. The latter alternative may be used to offload traffic from the macro cell to the pico cell, e.g., when the macro cell is highly loaded, and/or to provide better performance to the UE, such as by allowing simultaneous utilization of the pico cell and the corresponding macro cell, e.g., by carrier aggregation.

In the illustrated scenario, it is assumed that the macro cells are based on one or more of the above-mentioned cellular radio access technologies. The pico cells may utilize the same cellular radio access technologies. For example, both the macro cells and the pico cells could use the LTE radio access technology. However, the pico cells may also utilize another radio technology. Further, the radio technology utilized by a particular pico cell may also be different from the cellular radio access technology of the macro cell in the coverage area of which the pico cell is located in. For example, the macro cell could use the UMTS radio access technology and the pico cell could use the LTE radio access technology. According to another example, the macro cell could use the LTE radio access technology, and the pico cell could use the WLAN radio technology.

As further illustrated, the mobile communication network includes a cell management controller 100. The cell management controller 100 may be a standalone node or may be integrated in a node providing other functionalities, e.g., in a gateway, such as a Packet Data Gateway (PGW), or in a base station with enhanced functionalities, such as an evolved Node B (eNB) of the LTE radio access technology. In an LTE scenario, the cell management controller 100 may for example be integrated in an eNB which implements the macro base station. Accordingly, the cell management controller 100 may be located in the radio access network (RAN) part of the mobile communication network, e.g., when being implemented in an eNB, or in the core network (CN) part of the mobile communication network.

The cell management controller 100 has interfaces to the base stations 110, 120. Using these interfaces, the cell management controller may send control messages to the pico base stations 120 to switch the pico base stations 120 between an active state and an inactive state. In the active state, the pico base station 120 may operate in a conventional manner and accept attachment of one or more UEs in its cell. The cell of the pico base station 120 may then be utilized for increasing the capacity and/or performance of the mobile communication network, e.g., by offloading traffic to the cell of the pico base station 120 or allowing utilization of carrier aggregation with the pico base station 120 and the corresponding macro base station 110. In the inactive state, the pico base station 120 may partially power down and switch off certain components. For example, the pico base station may switch off a radio transmitter, a radio receiver, and/or other components, e.g., as needed for processing data to be sent or received data. In this way, power consumption by the pico base station 120 may be reduced significantly. In addition, interference caused by the pico base station may be reduced. However, in the inactive state of the pico base station 120 no UEs may be attached to the pico cell. The UEs in the coverage area of the pico cell may then be served by the corresponding macro cell.

Further, the cell management controller 100 may also use the interfaces to the base stations 110, 120 for receiving information from the base stations 110, 120. As will be further explained below, such information may in particular include positioning data of UEs.

FIG. 2 schematically illustrates structures of the pico base station 120 which may be used for implementing the switching between the active state and the inactive state.

As illustrated, the pico base station 120 includes a radio transmitter 122, a radio receiver 124, a controller 126, and a control interface 128. Other components may be present as well, but are not illustrated for the sake of clarity. The pico base station 120 may use the radio transmitter for sending radio signals to the UEs attached to the pico cell. Similarly, the pico base station 120 may use the radio receiver 124 for receiving radio signals from the UEs attached to the pico cell. Further, the pico base station 120 may use the radio receiver 120 for measurement purposes.

The controller 126 may be used for switching the pico base station 120 between the active state and the inactive state. This is accomplished in accordance with control messages received over the control interface 128. In particular, for switching the pico base station 120 to the inactive state, the controller 126 may switch off the radio transmitter 122 and optionally also other components, such as the radio receiver 124. However, in some implementations, the radio receiver 124 could be left switched on in the inactive state, thereby allowing the radio receiver 122 to be used for certain measurements. The controller 126 and the control interface 128 remain switched on in the inactive state, thereby allowing the cell management controller 100 to remotely control the pico base station 120 to switch back to the active state when needed.

In the illustrated embodiments, the cell management controller 100 uses positioning data of one or more UEs for controlling the switching of the pico base stations 120 between the active state and the inactive state. This will be further explained by referring to exemplary scenarios as illustrated in FIGS. 3 and 4.

FIG. 3 schematically illustrates the coverage area of one of the macro cells 200 and the coverage areas of the pico cells 210, 220, 230, 240 within the macro cell 200. As illustrated, the coverage areas of the pico cells 210, 220, 230, 240 are smaller than the coverage area of the macro cell 200 and are located within the coverage area of the macro cell 200.

Further, FIG. 3 illustrates exemplary UEs 11, 12, 13, 14, 15, 16 within the coverage area of the macro cell 200. The UEs may correspond to mobile phones, smartphones, tablet computers, laptop computers, or the like. Each UE 11, 12, 13, 14, 15, 16 may either be served by the macro cell 200 or by one of the pico cells 210, 220, 230, 240.

However, it is not necessary to always utilize all the pico cells 210, 220, 230, 240. For example, if the load of the macro cell 200 is low, e.g., below a threshold, all the pico cells 210, 220, 230, 240 could be switched to the inactive state, thereby reducing power consumption and interference.

Further, depending on the location of the UEs 11, 12, 13, 14, 15, 16 relative to the coverage areas of the pico cells 210, 220, 230, 240, some of the pico cells 210, 220, 230, 240 may be better suited than others for offloading traffic from the macro cell 200 or improving performance for one or more of the UEs 11, 12, 13, 14, 15, 16.

In the scenario of FIG. 3, the UEs 11, 12 are located within the coverage area of the pico cell 210, and the UE 16 is located within the coverage area of the pico cell 240. No UEs are located in the coverage areas of the pico cells 220 and 230. Accordingly, in the illustrated scenario the pico cells 210 and 240 are better suited than the other pico cells 220, 230 for offloading traffic from the macro cell 200 or improving performance for one or more of the UEs 11, 12, 13, 14, 15, 16. Among the pico cells 210 and 240 the pico cell 210 may be regarded as the best suited, because more UEs are located in the coverage area of the pico cell 210 than in the coverage area of the pico cell 240. Accordingly, if one pico cell is sufficient for offloading traffic from the macro cell 200, the cell management controller 100 may decide to switch the pico cell 210 in to the active state and switch the pico cells 220, 230, 240 to the inactive state. If further capacity is needed, the cell management controller 100 may decide to also switch the pico cell 240 to the active state. The other pico cells 220, 230 may be left in the inactive state, because there is no UE in their coverage area.

In the illustrated concepts, the cell management controller 100 obtains positioning data of the UEs 11, 12, 13, 14, 15, 16 in order to assess the suitability of the pico cells 210, 220, 230, 240 in the given scenario. In particular, from positioning data indicating the location of the UEs 11, 12, 13, 14, 15, 16, the cell management controller 100 may determine that the UEs 11, 12 are within the coverage area of the pico cell 210 and that the UE 16 is in the coverage area of the pico cell 240. Depending on this determination, the cell management controller 100 may select the active state for the pico cells 210 and 240, and select the inactive state for the pico cells 220, 230. If the capacity of the macro cell 200 is sufficient for accepting also the UE 16, the cell management controller could also select the inactive state for the pico cell 240. If the capacity of the macro cell 200 is sufficient for accepting all the UEs 11, 12, 13, 14, 15, 16, the cell management controller 100 may also select the inactive state for all the pico cells 210, 220, 230, 240.

The cell management controller 100 may receive the positioning data from one or more of the base stations 110, 120 of the mobile communication network. For example, the UEs 11, 12, 13, 14, 15, 16 may perform satellite positioning measurements to determine their location and optionally also other positioning data, such as velocity or direction of movement, and report the measurements to the base station 110, 120 of the cell they are currently attached to. These base stations 110, 120 may then report the positioning data to the cell management controller 100. Alternatively, one or more of the base stations 110, 120 may perform multilateration and/or multiangulation measurements for determining the locations of the UEs 11, 12, 13, 14, 15, 16, and optionally also other positioning data, such as velocity or direction of movement. The base stations 110, 120 may then report the measurements to the cell management controller 100. In some implementations, also pico base stations 120 which are currently in the inactive state may participate in such measurements. For this purpose, the radio receiver 124 may be left switched on in the inactive state.

As mentioned above, in some implementations the positioning data may also include other information than the location, e.g., the velocity of the UE and/or the direction of movement of the UE. Such information may be taken into account by the cell management controller 100 as well. This will be further explained in the following, by referring to the exemplary scenario of FIG. 4.

The scenario of FIG. 4 is similar to that of FIG. 3, but involves changed locations of some of the UEs 11, 12, 13, 14, 15, 16. In particular, in the scenario of FIG. 4 the UE 16 has moved out of the coverage area of the pico cell 240, and the UE 14 is moving toward the coverage area of the pico cell 230.

Depending on the positioning data of the UEs 11, 12, 13, 14, 15, 16, the cell management controller 100 may therefore decide to switch the pico cell 240 to the inactive state, because there is no more UE in the coverage area of the pico cell 240.

Further, concerning the pico cell 230, the cell management controller 100 may determine that the UE 14 is not yet in the coverage area of the pico cell 230, but moving toward the coverage area of the pico cell 230 so that it can be expected to enter the coverage area of the pico cell 230. In particular, the cell management controller 100 may estimate a future location of the UE 14 from its current location, current direction of movement, and current velocity of the UE 14. Then the cell management controller 100 may determine that this future location is within the coverage area of the pico cell 230. Accordingly, the cell management controller 100 may decide to switch the pico cell 230 to the active state. If the velocity of the UE 14 is too high, e.g., above a threshold, the cell management controller 100 may rather select the inactive state of the pico cell 230, because the UE 14 might move too fast through the coverage area of the pico cell 230 and switching the pico cell 230 to the active state is therefore not appropriate. Concerning the future location, this may be estimated at for one or more future points of time which are before new positioning data for the UE 14 are reported to the cell management controller 100. For example, new positioning data of the UEs 11, 12, 13, 14, 15, 16 could be reported to the cell management controller 100 every 10 s, and the cell management controller 100 could estimate the future location for every 1 s interval in these 10 s, starting from the last reported positioning data, until new positioning data are reported. In this way, the locations of the UEs can be assessed in an accurate manner, without causing excessive signaling overhead for reporting the positioning data.

FIG. 5 shows a flowchart for illustrating a method according to an embodiment of the invention, which may be used to implement the above functionalities of the cell management controller 100 in a node of a mobile communication network. In the method of FIG. 5, the mobile communication network is assumed to include a first cell and a second cell arranged in the coverage area of the first cell. In a typical heterogeneous network deployment, the first cell may correspond to a macro cell, e.g., the above cell 200, and the second cell may correspond to a pico cell, e.g., one of the above pico cells 210, 220, 230, 240.

At step 510, the node obtains positioning data of a UE, e.g., one of the UEs 11, 12, 13, 14, 15, 16. The positioning data may include information on a location of the UE. Alternatively or in addition, the positioning data comprise information on movement of the UE, e.g., a velocity of the UE and/or a direction of movement of the UE.

The positioning data of the UE may be based on satellite positioning measurements performed by the UE. Such measurements may be reported by the UE to the mobile communication network and then utilized for obtaining the positioning data. Alternatively or in addition, the positioning data of the UE may be based on multilateration measurements and/or multiangulation measurements performed by base stations of the mobile communication network. For example, trilateration or triangulation measurements could be used. The multilateration or multiangulation measurements may for example be performed by a base station of the first cell and one or more other base stations. Also the base station of the second cell may be involved in the multilateration or multiangulation measurements. The node may obtain the positioning data on the basis of a regular schedule or in response to a certain event, e.g., when the UE attaches to the first cell or second cell.

At step 520, the node correlates the positioning data with a coverage area of the second cell. For this purpose, the node may perform various evaluations of the positioning data and comparison to the coverage area to of the second cell. For this purpose, the node may also store a data representation of the coverage area of the second cell. Such representation may be manually configured in the node and/or may be automatically learned depending on operating data of the second cell, e.g., indicating handovers of UEs to or from the second cell and the corresponding location of the UE.

The correlation may involve that the node determines whether location of the UE is within the coverage area of the second cell or outside the coverage area of the second cell.

Further, the correlation may involve that the node determines whether the UE moves toward the coverage area of the cell, using information on movement of the UE indicated in the positioning data. This may for example involve that the node estimates a future location of the UE and determines whether the future location of the UE is within the coverage area of the cell, e.g., as explained in connection with FIG. 4 for the UE 14.

At step 530, the node selects between an active state and an inactive state of the second cell. This is performed depending on the correlation of step 520. For example, in response to determining that the location of the UE is within the coverage area of the second cell, the node may select the active state of the second cell. Similarly, in response to determining that the location of the UE is outside the coverage area of the second cell, the node may select the inactive state of the second cell. Further, in response to determining that the future location of the UE is within the coverage area of the second cell, the node may select the active state of the second cell. In response to the velocity of the UE being above a threshold, the node may rather also the inactive state of the second cell, because the fast moving UE can be expected to be only for a limited time in the coverage area of the second cell.

The selection of step 530 may also consider further criteria, e.g., a load of the first cell and/or a performance requirement of the UE or of one or more further UEs. For example, if the load of the first cell is below a threshold, the node may select the inactive state of the second cell. Alternatively or in addition, the node may select the active state of the second cell if the performance requirement of the UE, e.g., in terms of data rate, exceeds a threshold. The second cell may then be used to enhance the performance with respect to the UE, e.g., by allowing the UE to utilize the first and second cell simultaneously, e.g., by carrier aggregation. Further, the selection of step 530 may also consider multiple UEs. For example, the active state may be selected if the current or locations of at least certain minimum number of UEs are found to be within the coverage area of the second cell. In this case, steps 510 and 520 may be performed for multiple UEs.

At step 540, the node controls a base station of the second cell. This control is accomplished in accordance with the selection of step 530. Specifically, the node may control the base station to switch to the active state if the active state is selected at step 530, and to switch to the inactive state if the inactive state is selected at step 530. In the inactive state, certain components of the base station of the second cell may be switched off. In particular, a radio transmitter of the base station may be switched off. Further, also a radio receiver of the base station may be switched off.

FIG. 6 schematically illustrates exemplary device structures of a node of a mobile communication network which may be used for implementing the functionalities of the cell management controller 100.

In the illustrated implementation, the node is provided with an interface 610 which allows for connecting to one or more base stations, e.g., to one or more of the base stations 110, 120. More specifically, the interface may allow for controlling the base station to switch between the above-mentioned active state and inactive state. The interface 610 may also be used for receiving information from the base station, e.g., the positioning data.

Further, the node is provided with one or more processors 620 coupled to the interface 610 and a memory 650 coupled to the processor(s) 620. The memory 650 may include suitable types of non-volatile and/or volatile memory, e.g., Random Access Memory (RAM), Read-Only-Memory (ROM), flash memory, or magnetic storage. The memory 650 may include data and/or program code to be used by the processor(s) 620 for implementing the above-described functionalities of the cell management controller.

In particular, the memory 650 may include a positioning module 660 with program code to be executed by the processor(s) 620 for implementing the functionalities of obtaining the positioning data, extracting location, velocity, or direction of movement from the positioning data, or the like.

Further, the memory 650 may include a correlation module 670 for implementing the above-described functionalities of correlating the positioning data with the coverage area of the cell, e.g., by determining whether or not the location or future location is within the cell coverage area of the cell.

Still further, the memory 650 may include a control module 680 with program code for implementing the above-mentioned functionalities of selecting between the active and inactive state and controlling the cell accordingly, e.g., by generating a control message and sending it over the interface 610.

It is to be understood that the illustration of FIG. 6 is merely schematic and that the device 120 may include other components which have not been illustrated, e.g., further interfaces, one or more additional processors, or the like.

As can be seen, the concepts as explained above allow for efficient cell utilization. In particular, a cell which is currently not needed may be switched to the inactive state, thereby reducing power consumption and interference. On the other hand, the cell may be switched to the active state if the positioning data indicate that the cell is suitable for improving capacity or performance of the mobile communication network.

It is to be understood that the concepts as explained above are susceptible to various modifications. For example, the concepts may be used in connection with various known technologies for obtaining positioning data of a UE. Also, various criteria could be additionally used in the selection between the active and inactive state of a cell, e.g., criteria considering multiple UEs and/or multiple cells. Further, the concepts may also be applied in scenarios with a more complex hierarchy of nested cells, e.g., with a macro cell, a pico cell within the coverage area of the macro cell, and a further sub-cell within the coverage are of the pico cell. The above mentioned first cell could then for example correspond to the pico cell, and the above-mentioned second cell could then correspond to the further sub-cell. Alternatively, both the pico cell and the further sub-cell could be regarded as instances of the above-mentioned second cell. In such scenarios, the concepts as described herein could also be used for deciding whether it is more appropriate to switch the pico cell and/or further sub-cell to the active state to improve the capacity and/or performance of the mobile communication network. Further, the concepts could be implemented using different hardware structures than illustrated in FIG. 6. For example, rather than using software code executed by one or more processors, at least some of the illustrated functionalities could be implemented by dedicated hardware.

The invention claimed is:

1. A method for managing cells of a mobile communication network comprising a first cell and a second cell arranged in a coverage area of the first cell, the method comprising:

obtaining, by a node of the mobile communication network, current positioning data of a user equipment, wherein the current positioning data indicates that the user equipment is outside a coverage area of a second cell and includes a current velocity of the user equipment and a current direction of movement of the user equipment;

estimating, by the node, a future location of the user equipment based on the current velocity of the user equipment and the current direction of movement of the user equipment;

determining, by the node, that the estimated future location of the user equipment is within the coverage area of the second cell;

selecting, by the node and in response to the estimated future location of the user equipment being determined to be within the coverage area of the second cell, one of an active state of the second cell when a velocity of the user equipment is below, or an inactive state when the velocity of the user equipment is above the threshold; and controlling, by the node, a base station of the second cell in accordance with the selected state.

2. The method according to claim 1, wherein the current positioning data comprise information on a location of the user equipment.

3. The method according to claim 2, comprising:

in response to the location of the user equipment being outside the coverage area of the second cell and the estimated future location of the user equipment being outside the coverage area of the second cell, the node selecting an inactive state of the second cell.

4. The method according to claim 1, comprising:
in response to a movement of the user equipment toward the coverage area of the second cell, the node selecting the active state of the second cell.

5. The method according to claim 1, wherein the selection between the active state and an inactive state of the second cell further depends on one of a load of the first cell or a performance requirement of the user equipment.

6. The method according to claim 1, wherein the current positioning data of the user equipment are based on satellite positioning measurements performed by the user equipment.

7. The method according to claim 1, wherein the current positioning data of the user equipment are based on one of multilateration measurements or multiangulation measurements performed by one or more base stations of the mobile communication network.

8. The method according to claim 1, wherein, in an inactive state of the second cell, one of a radio transmitter or a radio receiver of the base station of the second cell is switched off.

9. A node for management of cells of a mobile communication network comprising a first cell and a second cell arranged in a coverage area of the first cell, the node comprising:
an interface for controlling a base station of the second cell; and
at least one processor, the at least one processor being configured to:
obtain current positioning data of a user equipment, wherein the current positioning data indicates that the user equipment is outside a coverage area of a second cell and includes a current velocity of the user equipment and a current direction of the user equipment,
estimate a future location of the user equipment based on the current velocity of the user equipment and the current direction of movement of the user equipment;
determine that the estimated future location of the user equipment is within the coverage area of the second cell,
select, in response to the estimated future location of the user equipment being determined to be within the coverage area of the second cell, one of an active state of the second cell when a velocity of the user equipment is below, or an inactive state when the velocity of the user equipment is above the threshold, and
control the base station of the second cell in accordance with the selected state.

10. The node according to claim 9, wherein the current positioning data comprise information on a location of the user equipment.

11. The node according to claim 9, wherein the processor is further configured to select an inactive state of the second cell in response to the location of the user equipment being outside the coverage area of the second cell and the estimated future location of the user equipment being outside the coverage area of the second cell.

12. The node according to claim 9, wherein the processor is further configured to select the active state of the second cell in response to a movement of the user equipment toward the coverage area of the second cell.

13. The node according to claim 9, wherein the selection between the active state and an inactive state of the second cell further depends on one of a load of the first cell or a performance requirement of the user equipment.

14. The node according to claim 9, wherein the current positioning data of the user equipment are based on satellite positioning measurements performed by the user equipment.

15. The node according to claim 9, wherein the current positioning data of the user equipment are based on one of multilateration measurements or multiangulation measurements performed by one or more base stations of the mobile communication network.

16. The node according to claim 9, wherein the processor is further configured to power off one of a radio transmitter or a radio receiver of the base station of the second cell in an inactive state of the second cell.

* * * * *